United States Patent [19]
Warren

[11] Patent Number: 5,761,095
[45] Date of Patent: Jun. 2, 1998

[54] SYSTEM FOR MONITORING THE DEPTH OF SNOW

[75] Inventor: Larry K. Warren, Carrabassett Valley, Me.

[73] Assignee: RGS, LLC, Gray, Me.

[21] Appl. No.: 815,280

[22] Filed: Mar. 10, 1997

[51] Int. Cl.⁶ .................................................. G01B 7/00
[52] U.S. Cl. ........................................ 364/562; 364/420
[58] Field of Search .................................. 364/559, 564, 364/420; 701/207, 208, 213, 215; 342/457, 462, 357, 123; 324/323, 330, 329

[56] References Cited

U.S. PATENT DOCUMENTS

| | | | |
|---|---|---|---|
| 4,047,042 | 9/1977 | Wada et al. | 250/390 |
| 4,977,523 | 12/1990 | Mohler et al. | 364/550 |
| 5,075,693 | 12/1991 | McMillian et al. | |
| 5,266,799 | 11/1993 | Steinitz et al. | |
| 5,323,317 | 6/1994 | Hampton et al. | 364/420 |
| 5,379,215 | 1/1995 | Kruhoeffer et al. | 364/420 |
| 5,418,522 | 5/1995 | Freundlieb et al. | 340/581 |
| 5,434,574 | 7/1995 | Hayashi et al. | |
| 5,517,419 | 5/1996 | Lanckton et al. | |
| 5,528,518 | 6/1996 | Bradshaw et al. | |
| 5,557,278 | 9/1996 | Piccirillo et al. | |
| 5,568,385 | 10/1996 | Shelton | 364/420 |
| 5,686,841 | 11/1997 | Stolarczyk et al. | 324/635 |

*Primary Examiner*—James P. Trammell
*Attorney, Agent, or Firm*—Samuels, Gauthier, Stevens & Reppert

[57] ABSTRACT

A system is disclosed for monitoring the depth of snow with respect to the ground. The system may employ a global positioning system and includes an initialization unit for generating ground surface data representative of the surface of the ground. The system also includes a snow surface data acquisition unit for generating snow surface data representative of the surface of the snow. The system further includes an analysis unit in communication with the ground surface data and the snow surface data for comparing the ground and snow surface data. Snow depth data is then generated representative of the area between the ground and snow surfaces.

8 Claims, 6 Drawing Sheets

SYSTEM FOR MONITORING THE DEPTH OF SNOW

BACKGROUND OF THE INVENTION

The invention generally relates to systems for monitoring the depth of snow, and particularly relates to systems for use at recreational winter resort areas.

Recreational alpine skiing areas typically provide a variety of downhill ski trails or pistes on a mountain having a combination of natural and/or machine made snow. The process of making machine made snow is generally expensive as it involves transporting compressed air and water up a mountain to a series of nozzles distributed along the edge of the ski trails. Accordingly, resort areas strive to conserve their financial resources and make snow only in places where it is most needed. Decisions regarding the optimal placement and use of snow making equipment as well as the distribution of snow on a ski trail via snow grooming vehicles having plows, are sometimes extremely important, particularly when the amount of natural snow is very low. It is generally desirable to ensure a fresh, soft snow surface on as many trails as possible to provide the skier with a pleasurable skiing experience. The resort operator is typically interested in ensuring that skier traffic, melting of snow or wind scouring of the snow surface do not expose the ground. Also, it is desirable that snow coverage remain as complete as possible for as long as possible through the ski season.

There is a need, therefore, for resort operators to have snow depth information available throughout the season to facilitate the efficient use of snow making and snow grooming equipment.

SUMMARY OF THE INVENTION

The invention provides a system for monitoring the depth of snow with respect to the ground. The system includes a global positioning system (GPS) for generating ground surface data representative of the surface of the ground, and snow surface data representative of the surface of the snow. The system further includes an analysis unit in communication with the ground surface data and the snow surface data for comparing the ground and snow surface data. Snow depth data is then generated representative of the area between the ground and snow surfaces. In one embodiment, individually measured points on the ground surface and the snow surface are used to develop an approximated surface model of the ground and snow surfaces. The ground surface points may be recorded by mounting a GPS receiver on a tractor mower when there is no snow on the ground, and the snow surface points may be recorded during the winter by mounting a GPS receiver on snow grooming equipment.

BRIEF DESCRIPTION OF THE DRAWINGS

The following detailed description of the illustrated embodiments may be further understood with reference to the accompanying drawings in which.

DETAILED DESCRIPTION OF THE ILLUSTRATED EMBODIMENTS

Figure 1:
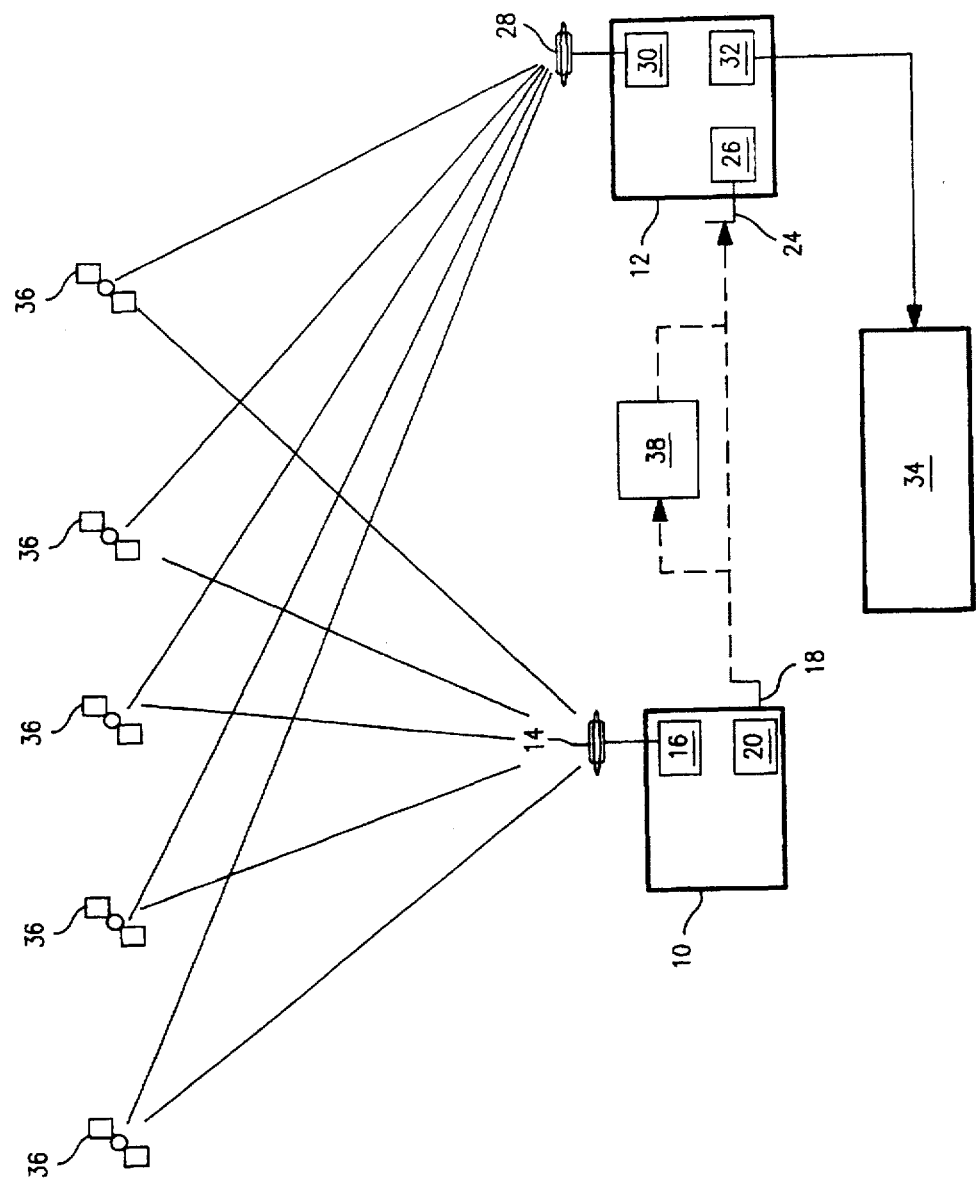
FIG. 1 is a functional block diagram representative of a system of the invention.

With reference initially to FIG. 1, a system of the invention includes a real time kinematic (RTK), global position system (GPS) with on-the-fly (OTF) capability and National Marine Engineering Association (NMEA) output. A suitable GPS system is the Trimble 4400 model RTK system sold by Trimble Navigation Limited, of Sunnyvale, California which provides accuracy of about 1 cm. As shown in FIG. 1, the GPS system includes an RTK base unit 10 and an RTK rover unit 12. The RTK base unit 10 includes a satellite receiver antenna 14 in communication with an RTK GPS base receiver and processor 16, and further includes a radio frequency (RF) Tx radio modem transmit antenna 18 in communication with an RF signal transmitter unit 20. The RTK base unit 10 is positioned at a fixed location having known longitude, latitude and elevation coordinates. A suitable location for the base unit 10 may be a building on an alpine ski resort mountain, preferably an exposed building that is on the mountain itself rather than one at the base of the mountain.

The RTK rover unit 12 includes a satellite receiver antenna 28 in communication with an RTK GPS rover receiver and processor 30, and further includes an RF Rx radio modem receiver antenna 24 in communication with an RF signal receiver unit 26. The RTK rover unit 12 also includes a data input/output (I/O) device 32, from which data may be periodically transferred to another location such as an administrative office 34, via e.g., electronic transfer, RF signal transfer, or manual transfer of a data diskette. The RTK rover unit 12 is preferably located within a tractor used for snow grooming operations.

Generally, during operation, satellite signals are continuously received from the available satellites 36 by the receiver antennas 14 and 28. The longitude, latitude, and elevation of the base unit 10 are known, and are compared with the signals received from the satellites by the antenna 14. The difference between the received and pre-recorded known data is used to correct the information received by the rover unit 12. This difference is communicated to the rover unit 12 by RF signal transmission from the RF signal transmitter 20 and antenna 18 to the RF signal receiver 26 and antenna 24. Optionally, the system may include a radio digipeter or repeater 38, to retransmit the RF signals transmitted from the base to areas of the mountain not reachable by the RF signal transmitter 20 alone.

Surface model information may thereby be obtained representative of the surface of the snow at every location covered by the snow grooming tractor. This snow surface data may then be compared with pre-recorded surface data representative of the surface of the ground without snow. The difference between the surfaces represents the volume of snow on a particular skiing trail.

Figure 2:
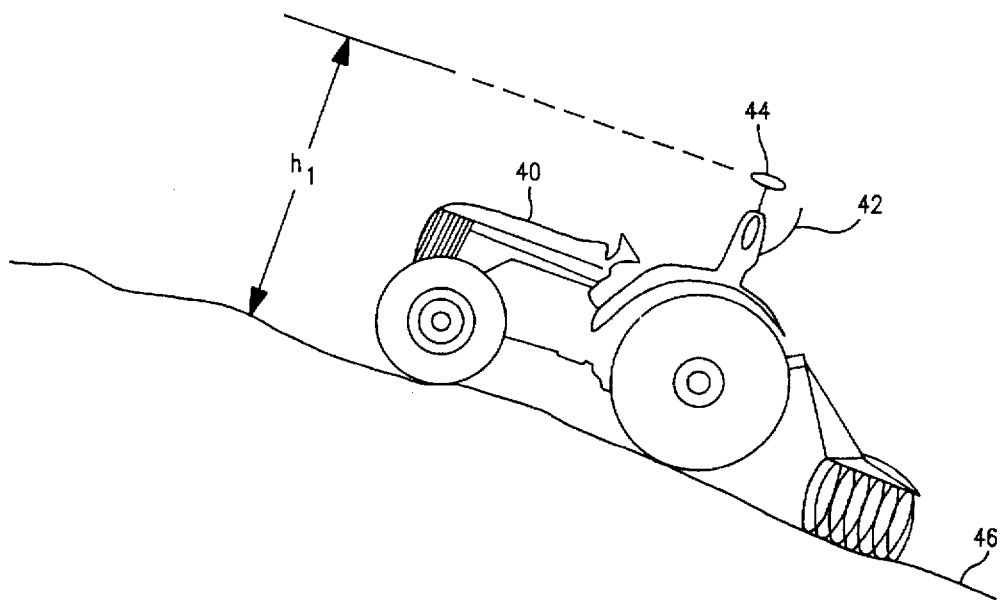
FIG. 2 is a diagrammatic representation of the equipment used for initialization of the system of FIG. 1.
Figure 5A:
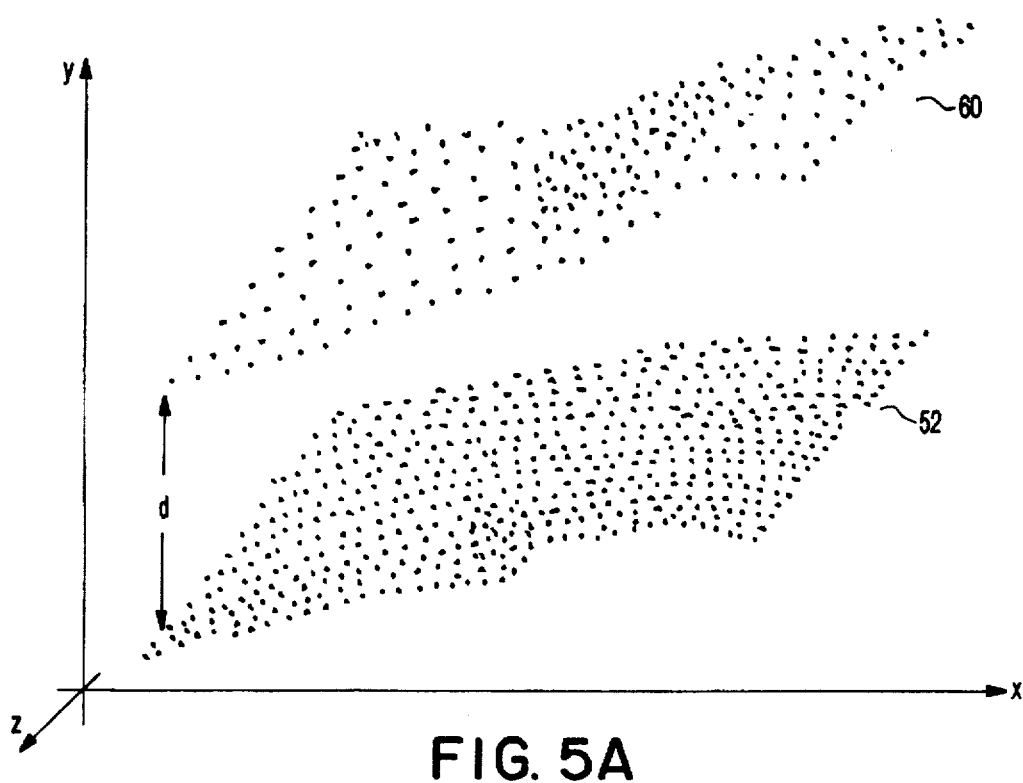
FIG. 5A ia a diarammatic graphical representation of surface data collected in accordance with the process of FIG. 4.

As shown in FIG. 2, initialization data representative of the ground surface may be acquired by employing, for example, a grass mowing tractor 40 during a time of year when there is no snow on the ground to map the surface of the ground 46. The tractor 40 includes an RTK rover unit having an RF signal receiver antenna 42 and a satellite receiver antenna 44 similar to the antennas 24 and 28 shown in FIG. 1. The collected data is corrected by the correction data from an RTK base unit 10 as discussed above, and the distance $h_1$ between the ground and the height of the antenna 44 is subtracted from the measured elevation. A grid map of the surface of the ground is thereby generated as shown at 52 in FIG. 5A, with each point on the grid (in x-y-z coordinates) being representative of a measured set of longitude, latitude and elevation data for a particular point on the surface of the ground. In other embodiments, the ground surface data may be compiled from a variety of sources, such as satellite imaging, radar imaging, aerial photography, stereophotography, analysis of contour maps, and reviewing other public records.

In the present embodiment, the development of the ground surface model is conducted during the time of year when there is no snow on the ground, preferably in the early spring or late fall when deciduous trees have shed their leaves, providing a better opportunity for satellite data collection. Ski resorts traditionally mow their ski trails in late summer and fall, providing an excellent opportunity to utilize existing manpower and equipment for the data collection process. As the GPS unit is maneuvered over the ground surface, the base elevation data is collected. This process need only be conducted once, as the ground surface is not likely to change over a long period of time. Data collection should be complete and cover all portions of the ski trail to ensure maximum accuracy. Satellite availability coordination is critical to the development of the data collection process. This can be facilitated through use of the Trimble 4400 software which provides a daily forecast of satellite availability and position information.

Figure 4:
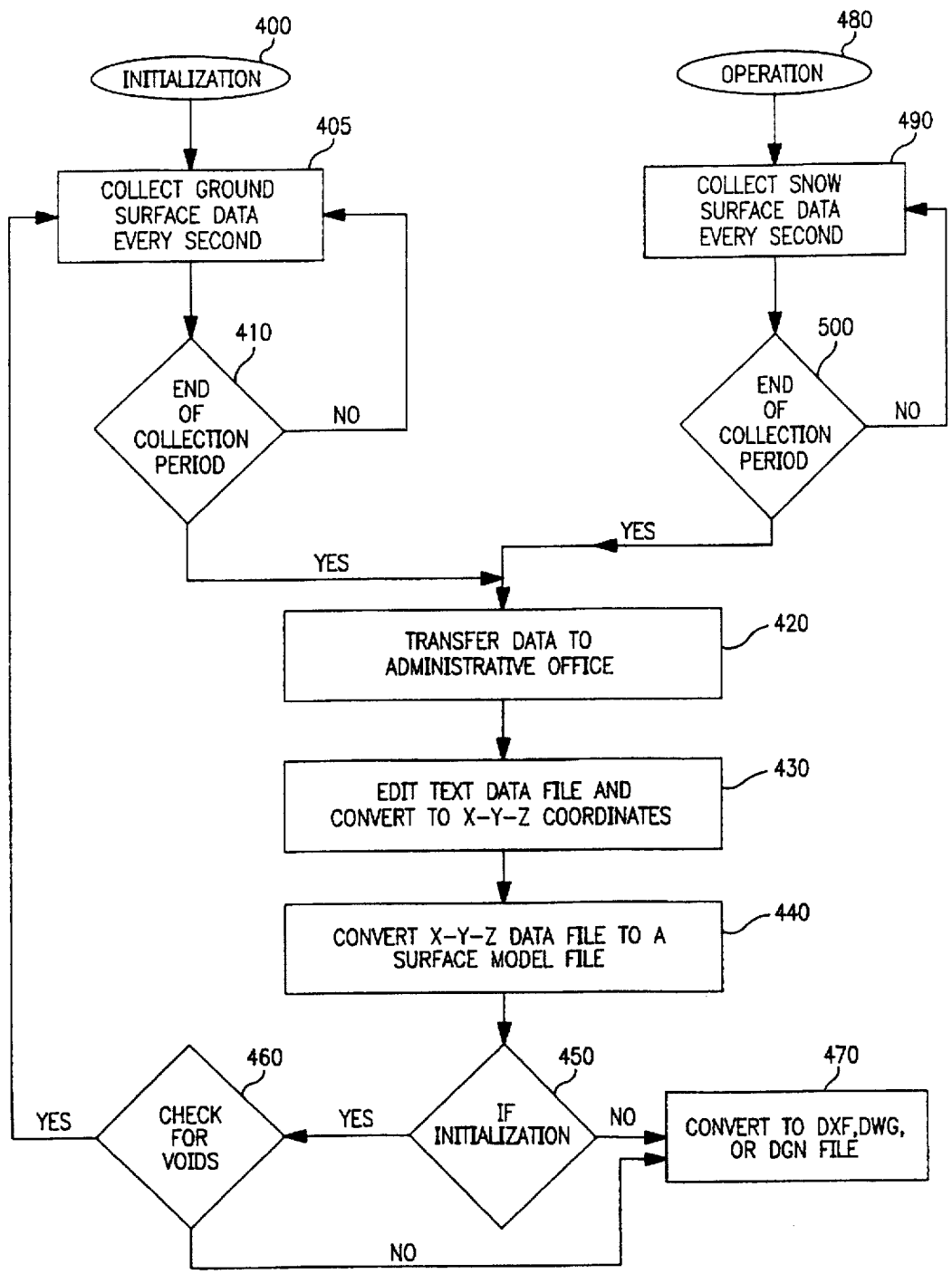
FIG. 4 is a flow chart showing the steps performed during the data collection process for initialization and operation.

As shown in FIG. 4, the initialization process for generating the ground surface model begins (step 400) with the collection of data by the RTK rover unit in the tractor 40 (step 405). Data is generated for a point every second, and recorded in NMEA format until the period for recording data is complete (step 410). The period for collecting the data may be, for example, a week or a month. The recorded data is then transferred (step 420) to the administrative office 34 as shown in FIG. 1 where it is stored as a text file.

The NMEA text file includes projection information, time, date, latitude, longitude, elevation, signal quality, number of satellites observed, percentage of precipitation dilution, and units of measure. The quality of the signal is of significant importance and it is preferred that only signals meeting a minimum quality threshold be used, e.g., signals received from 3 or more satellites.

The data file is then processed (step 430) and converted to a selectively edited file that includes a series of x-y-z coordinates. This step includes purging data that was recorded when the quality of the signal was low, and elimination of NMEA data that is unused, e.g., time, date etc. This edited text file is then converted (step 440) to a ground surface model file by modeling software such as, for example, QUICKSURF sold by Schreiber Instruments, Inc. of Denver, Colo., SURVEY COMPLETE sold by Softdesk, Inc. of Henniker, N.H., or SITEWORKS sold by Intergraph Corporation of Huntsville, Md. The data is then reviewed (step 450) to ensure that the data points are within the defined ski trails. The administrator may elect the output option of his or her choice for the ground surface model file 50 which includes, e.g., a grid as shown at 54 in FIG. 5B, a contour mapping as shown at 56 in FIG. 5C, or a triangulated integer network (TIN) as shown at 58 in FIG. 5D.

Once the ground surface model is imported to the surface modeling software during initialization, the outline of the ski trails or trail sections should be defined by a computer aided design (CAD) closed polyline to capture all relevant data points within the boundary of the polylines. The ground surface model file should then be thoroughly reviewed (step 460) to ensure that there are no significant areas void of geographic point data. In the event a void area does exist, such as areas where there is no grass to be mowed, additional data collection in the void area should be conducted and the data collected should be added to the initialization file.

When the ground data collection process is finished and the ski trails have been completely mapped, the ground surface data is converted (step 470) to drawing file format, e.g., a drawing exchange file (DXF), an Autocad file (DWG), or Microstation file (DGN). The drawing file is then transferred to a geographical interface (GIS) or CAD system. The file may also be transferred to various other software and/or hardware such as a network server, a video display or a printer.

Figure 3:
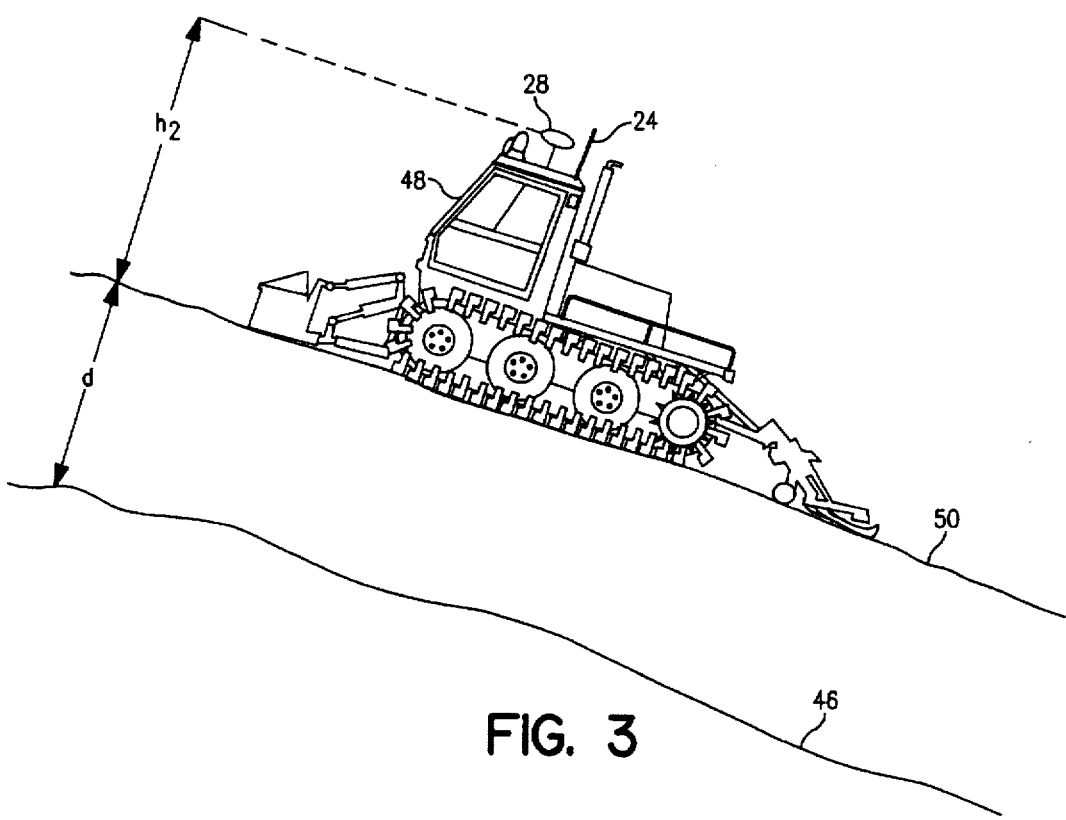
FIG. 3 is a diagrammatic representation of the equipment used for operation of the system of FIG. 1.

As shown in FIG. 3, during operation in the winter, surface data is generated by employing a snow grooming tractor 48 including an RTK rover unit 12 having an RF receiver antenna 24 and a satellite receiver antenna 28. Again, the collected data is corrected by the correction data from an RTK base unit, and the distance $h_2$ between the ground and the height of the antenna 28 is subtracted from the measured elevation. A map 60 of the surface of the snow is thereby generated, with each data point (in x-y-z coordinates) being representative of a measured set of longitude, latitude and elevation data for a particular point on the surface of the snow. The volume indicated at d and extending across the area of the ski trail, may be calculated from the snow surface data map and the ground surface data map.

Operational data collection is commenced (step 480) when the administrator desires and when sufficient snow is present to provide snow surface data collection opportunity. Data collection (step 490) is conducted as generally discussed above in connection with FIGS. 1 and 3 by maneuvering the RTK GPS rover unit over the snow surface until the end of the data collection period (step 500). The data collection can be done by a skier, by walking, by snow mobile, by all-terrain-vehicle, or by snow grooming equipment. It is believed to be efficient to utilize the snow grooming vehicles during their normal snow grooming operations. Ski resorts generally groom their trails after the close of operation each day and frequently operate through the night until the ski area opens in the morning. The data collection process by snow grooming vehicle is done without modification of the normal grooming operations, and is generally an activity that can be easily performed by the vehicle operator.

The operational data collection process is conducted as the administrator deems necessary, but generally it is recommended to be done daily. The ski resort may equip one or many vehicles with the necessary RTK GPS equipment, and coordinate the grooming activities to correspond with the desired trails to be modeled.

The data collection is done as the grooming is performed and unlike during initialization, the data is fully processed and converted to a drawing file (steps 420, 430, 440, and 470) irrespective of whether void areas exist in the surface model. If void areas exist, the system may designate the trails for which the data is incomplete as having insufficient data. The data for that trail may either be used to generate snow depth data, or may be ignored until a data collection team is able to generate a complementary set of data to complete the file. The processing of the text file and purging of the data for poor quality satellite signals is done as discussed above in connection with the initialization process.

Figure 5B:
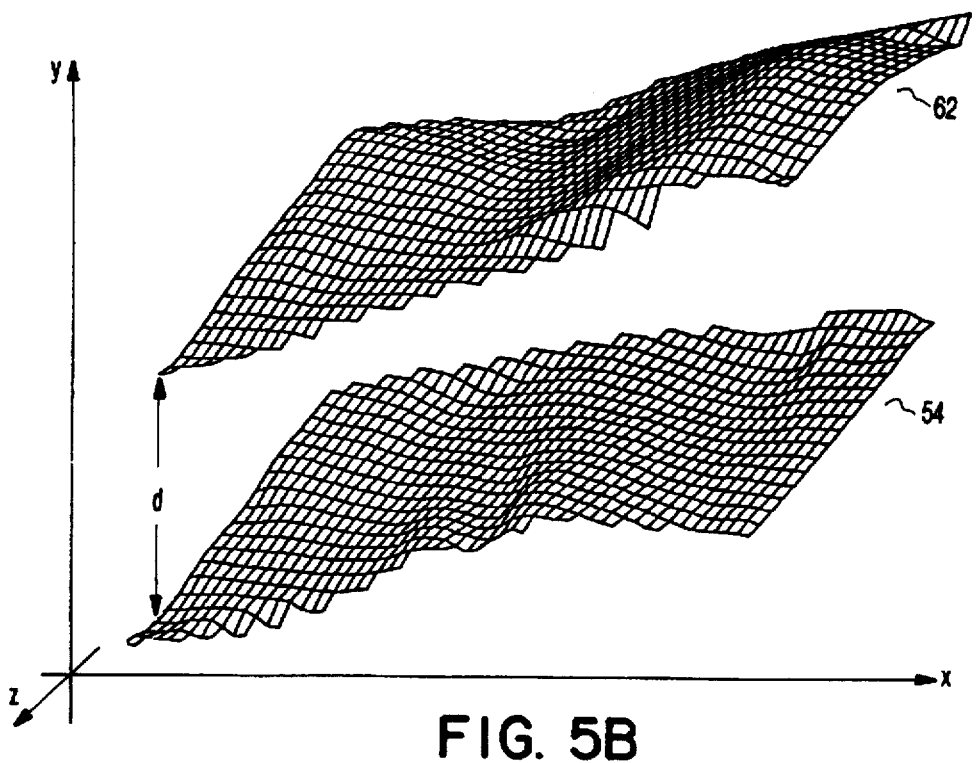
FIGS. 5B–5D are diagrammatic graphical representations of surface models generated in accordance with the process of FIG. 4.
Figure 5C:
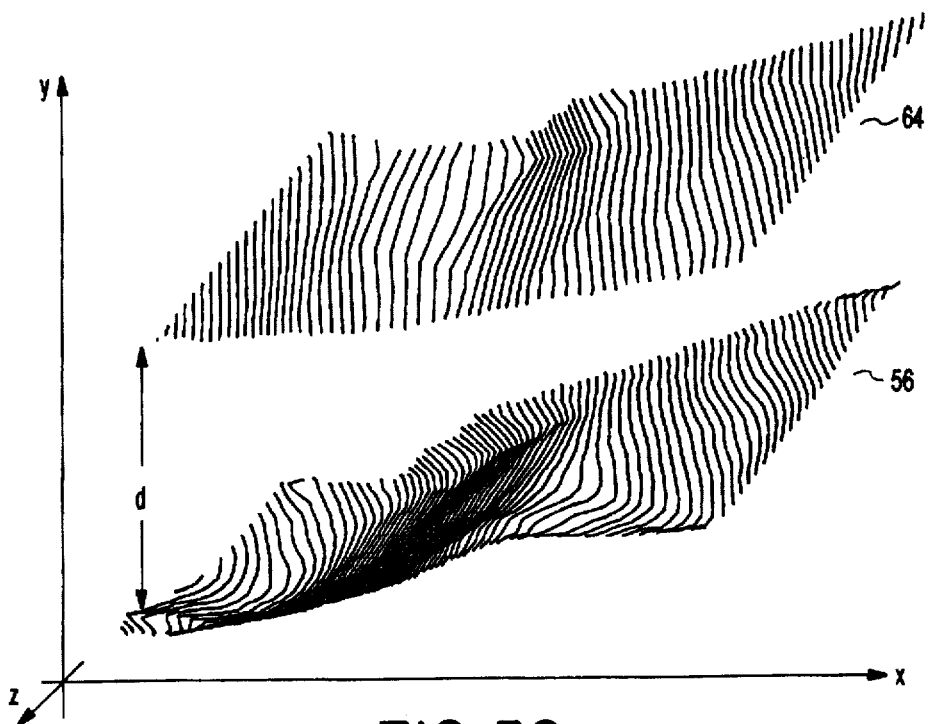
Figure 5D:
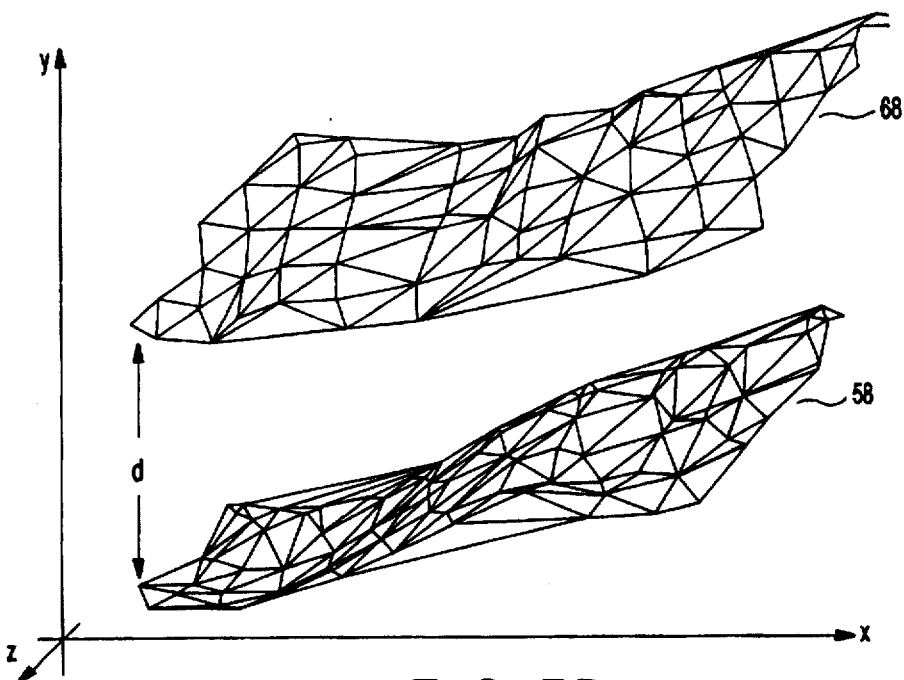

The map 60 of the snow surface is then converted to a grid pattern as shown at 62 in FIG. 5B, a contour mapping as shown at 64 in FIG. 5C, or a TIN pattern as shown at 66 in FIG. 5D by interpolating the necessary data points from the non-uniform set of measured data in the map 60 similar to the generation of surfaces 54,56 and 58 from the non-uniform ground surface data 52.

The surface modeling software then combines the snow surface model data with the ground surface model data in a graphical representation. The volume of snow is determined by developing a snow depth model, which is calculated by the surface modeling software. Again, the file output format may be, for example, grid, TIN, or contour, etc. at the discretion of the system administrator. The snow depth model is computed by calculating the difference between the initialization model and the snow surface model. The model is output in a file configuration compatible with the CAD or GIS system format (e.g., DXF, DWG, or DGN) used by the administrator. In alternative embodiments, the output file may include a plan view of each ski trail in multiple colors with each color representing a different range of snow depth. The snow depth file is available for printing, viewing or manipulating after the compilation has been completed, and may be stored for later review.

Figure 6:
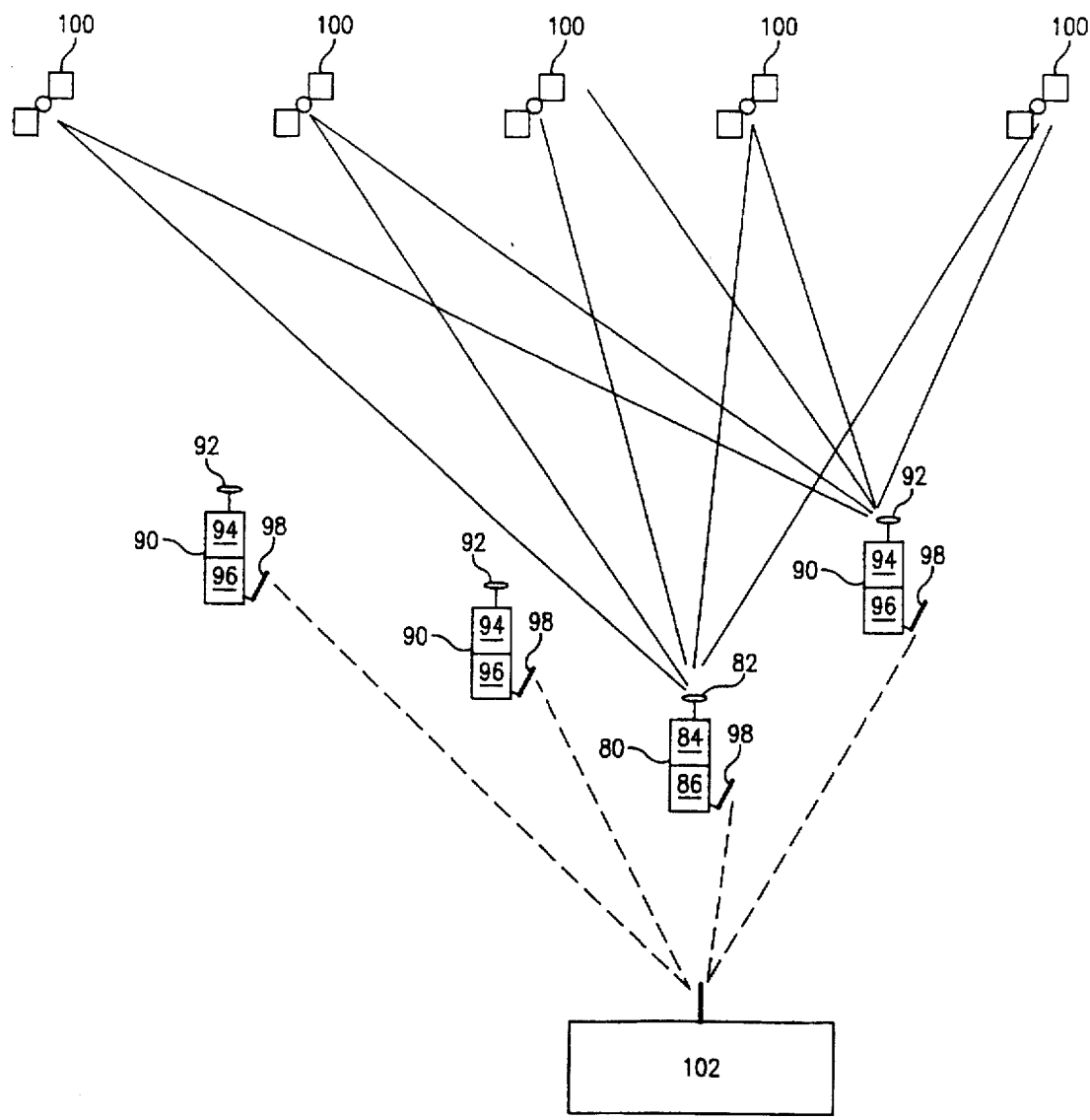
FIG. 6 is functional block diagram of another embodiment of the invention.

As shown in FIG. 6, an alternative embodiment of a system of the invention includes an RTK base unit 80 positioned at a fixed location, and including a satellite antenna 82 and an RTK base receiver 84. The base unit 80 also includes an RF transmitter 86 and an RF transmitter antenna 88. The system further includes a plurality of RTK rover units positioned in snow grooming tractors 90, each of which also includes a satellite receiver 92, an RTK rover unit 94, an RF transmitter 96, and an RF transmitter antenna 98.

In this system, the signals from the satellites 100 that are received by the receivers in the roving units 92 are sent directly via RF transmission, without processing or editing, to a central station such as an administrative office 102. In such a system, all of the data filtering and processing is performed at the office 102. The base unit operates as it does in the system as disclosed above with reference to FIG. 1, with the exception that the signal is received at the base as opposed to the roving units. This system permits each rover unit to include much less equipment, and avoids the need to have data periodically downloaded from the snow grooming equipment.

Those skilled in the art will appreciate that numerous modifications and variations may be made to the above disclosed embodiments without departing from the spirit and scope of the invention.

I claim:

1. A system for monitoring the depth of snow with respect to the ground, said system comprising:

initialization means for generating ground surface data representative of the surface of a section of ground;

acquisition means for generating snow surface data representative of the surface of the snow on said section of ground; and analysis means in communication with said ground surface data and said snow surface data for comparing said ground and snow surface data, and for generating data representative of the snow depth between said ground and snow surfaces.

2. A system as claimed in claim 1, wherein said system further includes output means for displaying said snow depth data.

3. A system as claimed in claim 1, wherein said acquisition means includes means for receiving radio transmission signals from a plurality of satellites.

4. A system as claimed in claim 1, wherein said analysis means includes means for identifying and filtering unreliable data from the satellites.

5. A system as claimed in claim 1, wherein said acquisition means includes reference means for generating reference data representative of the difference between known position data and measured position data, and correction means for correcting said generated snow surface data by said reference data.

6. A system for monitoring the depth of snow with respect to the ground at an alpine ski resort, said system comprising:

initialization means for generating three dimensional ground surface data representative of the surface of a section of ground;

acquisition means including a global positioning system for generating three dimensional snow surface data representative of the surface of the snow on said section of ground; and filter means for identifying and removing unreliable data from said snow surface data; and display means for displaying said ground surface data and said snow surface data.

7. A system as claimed in claim 6, wherein said acquisition means further includes approximation means for generating said three dimensional snow surface data by interpolating between actually measured data points.

8. A system for monitoring the depth of snow with respect to the ground, said system comprising:

initialization means for generating ground surface data, said ground surface data including ground surface data points each of which is representative of the longitude, latitude and elevation of a point on the surface of a section of ground;

acquisition means for generating snow surface data, said snow surface data including snow surface data points each of which is representative of the longitude, latitude and elevation of a point on the surface of the snow on said section of ground;

approximation means for generating ground surface model data representative of the surface of said ground from said ground surface data, and for generating snow surface model data representative of the surface of said snow from said snow surface data; and analysis means in communication with said ground surface model data and said snow surface model data for comparing said ground and snow surfaces, and for generating data representative of the snow depth between said ground and snow surfaces.

* * * * *